United States Patent
Liu et al.

(10) Patent No.: US 10,824,307 B2
(45) Date of Patent: Nov. 3, 2020

(54) INFORMATION TRANSMISSION DEVICE AND OPERATING METHOD THEREFOR

(71) Applicant: Samsung Electronics Co., Ltd., Suwon-si, Gyeonggi-do (KR)

(72) Inventors: Ying Liu, Tianjin (CN); Hao Su, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 15/749,456

(22) PCT Filed: Jul. 8, 2016

(86) PCT No.: PCT/KR2016/007432
§ 371 (c)(1),
(2) Date: Jan. 31, 2018

(87) PCT Pub. No.: WO2017/022965
PCT Pub. Date: Feb. 9, 2017

(65) Prior Publication Data
US 2018/0217728 A1    Aug. 2, 2018

(30) Foreign Application Priority Data

Aug. 6, 2015 (CN) ........................... 2015 1 0476846
May 2, 2016 (KR) ........................ 10-2016-0054098

(51) Int. Cl.
*G06F 3/0484* (2013.01)
*G06F 3/0354* (2013.01)
(Continued)

(52) U.S. Cl.
CPC .......... *G06F 3/0484* (2013.01); *G06F 3/0354* (2013.01); *G06F 3/04817* (2013.01);
(Continued)

(58) Field of Classification Search
CPC .......................... G06F 3/04842; G06F 1/1626
See application file for complete search history.

(56) References Cited

U.S. PATENT DOCUMENTS 7,903,093 B2    3/2011   Kim et al.
8,606,331 B2   12/2013   Yue
(Continued)

FOREIGN PATENT DOCUMENTS

KR    1020130038753 A    4/2013
KR      101425755 A      8/2014
(Continued)

OTHER PUBLICATIONS

International Search Report and Written Opinion for International Application No. PCT/KR2016/007432, dated Sep. 12, 2016. (19 pages).

*Primary Examiner* — Rayeez R Chowdhury

(57) ABSTRACT

An information transmission method, which is a method in which an information transmission apparatus transmits information through a dial pad during a call in a terminal, includes: executing an application program storing all or part of the information and displaying an application interface including the all or part of the information; executing the dial pad in a state where the application interface is displayed, and simultaneously displaying the dial pad and the application interface; and transmitting the information to another party through the dial pad, based on content of the application interface.

17 Claims, 15 Drawing Sheets

(51) Int. Cl.
*H04L 12/58* (2006.01)
*G06F 3/0488* (2013.01)
*H04M 1/725* (2006.01)
*H04M 1/2747* (2020.01)
*G06F 3/0481* (2013.01)

(52) U.S. Cl.
CPC ........ *G06F 3/04886* (2013.01); *H04L 51/046* (2013.01); *H04L 51/06* (2013.01); *H04M 1/2747* (2020.01); *H04M 1/72519* (2013.01); *G06F 2203/04804* (2013.01); *H04M 1/72547* (2013.01); *H04M 1/72583* (2013.01)

(56) References Cited

U.S. PATENT DOCUMENTS

| | | | |
|---|---|---|---|
| 9,374,447 B2 | 6/2016 | Kim et al. | |
| 9,419,923 B2 | 8/2016 | Seo et al. | |
| 2006/0015819 A1* | 1/2006 | Hawkins | H04M 1/72522 715/780 |
| 2006/0168539 A1* | 7/2006 | Hawkins | H04M 1/27475 715/780 |
| 2008/0174564 A1* | 7/2008 | Kim | G06F 3/0488 345/173 |
| 2008/0262664 A1* | 10/2008 | Schnell | G01C 23/00 701/4 |
| 2010/0099390 A1* | 4/2010 | Vendrow | H04M 1/72563 455/414.1 |
| 2013/0138443 A1* | 5/2013 | Kim | H04M 1/2535 704/270.1 |
| 2013/0159170 A1* | 6/2013 | Gandhi | G06Q 40/02 705/39 |
| 2014/0063175 A1* | 3/2014 | Jafry | H04M 1/72519 348/14.02 |
| 2014/0221049 A1* | 8/2014 | Kim | H04M 1/56 455/566 |
| 2015/0057048 A1* | 2/2015 | Wang | H04M 3/44 455/564 |
| 2015/0067594 A1 | 3/2015 | Choi et al. | |
| 2016/0342327 A1* | 11/2016 | Chi | G06F 3/04883 |

FOREIGN PATENT DOCUMENTS

| | | |
|---|---|---|
| KR | 1020140099123 A | 8/2014 |
| KR | 1020150026500 A | 3/2015 |
| KR | 1020150042454 A | 4/2015 |

* cited by examiner

INFORMATION TRANSMISSION DEVICE AND OPERATING METHOD THEREFOR

CROSS-REFERENCE TO RELATED APPLICATIONS AND CLAIM OF PRIORITY

The present application claims benefit under 35 U.S.C. § 365 and is a 371 National Stage of International Application No. PCT/KR2016/007432, filed Jul. 8, 2016, which claims priority to Chinese Patent Application No. 201510476846.7, filed on Aug. 6, 2015 and Korean Patent Application No. 10-2016-0054098, filed on May 2, 2016, the disclosures of which are fully incorporated herein by reference into the present disclosure as if fully set forth herein.

TECHNICAL FIELD

Embodiments of the present disclosure relate to a method and apparatus for transmitting information in a terminal.

BACKGROUND

Along with developments in electronic device technology, users are able to execute increasingly more functions through electronic devices. However, as functions of electronic devices increase, users' new expectations about electronic devices have also been increasing.

For example, a phone call function of mobile terminals is a main function of mobile terminals. However, as users become accustomed to talking on the phone by using a mobile terminal, users have gradually increasingly demanded additional convenience in addition to the phone call function. For example, demand for technology for conveniently transmitting, when making a phone call, account information or numbers or letters stored in a terminal to the other party has arisen.

SUMMARY

The present embodiments provide an apparatus for conveniently transmitting information during a call, and an operation method of the apparatus.

As a technical means of addressing the above technical problem, according to an embodiment, an information transmission method, which is a method of transmitting information through a dial pad during a call, includes: executing an application program storing all or part of the information and displaying an application interface including the all or part of the information; executing the dial pad in a state where the application interface is displayed, and simultaneously displaying the dial pad and the application interface; and transmitting the information to another party through the dial pad, based on content of the application interface.

The dial pad may be executed by receiving an input via a floating button indicating the dial pad.

At least one of the floating button indicating the dial pad and the dial pad may be transparently displayed.

The dial pad may be executed by receiving an input via a dial pad button added to a notification bar.

The information transmission method may further include executing a call process.

The executing of the dial pad and the simultaneously displaying of the dial pad and the application interface may include displaying the dial pad and the application interface to at least partially overlap each other.

When the application program storing the all or part of the information includes a plurality of application programs, a plurality of application interfaces including the all or part of the information are simultaneously displayed by executing the plurality of application programs.

The information transmitted to the other party may be received as an input value of an application program installed at the other party.

The information transmitted to the other party may be received by the other party through execution of a predetermined application program.

The information transmitted to the other party may be received in a predetermined short message service (SMS) form by the other party.

According to another aspect of an embodiment of the present invention, an information transmission apparatus, which is an apparatus for transmitting information through a dial pad during a call, includes: a display; and a controller configured to: execute an application program storing all or part of the information and display an application interface including the all or part of the information; execute the dial pad in a state where the application interface is displayed, and simultaneously display the dial pad and the application interface; and transmit the information to another party through the dial pad, based on content of the application interface.

The dial pad may be executed by receiving an input via a floating button indicating the dial pad.

At least one of the floating button indicating the dial pad and the dial pad may be transparently displayed.

The dial pad may be executed by receiving an input via a dial pad button added to a notification bar.

The controller may be further configured to execute a call process.

The controller may be further configured to control display of the dial pad and the application interface to at least partially overlap each other.

When the application program storing the all or part of the information includes a plurality of application programs, a plurality of application interfaces including the all or part of the information may be simultaneously displayed by executing the plurality of application programs.

The information transmitted to the other party may be received as an input value of an application program installed at the other party.

The information transmitted to the other party may be received by the other party through execution of a predetermined application program.

The information transmitted to the other party may be received in a predetermined short message service (SMS) form by the other party.

According to another aspect of an embodiment of the present disclosure, a computer-readable recording medium that stores computer program codes for performing, when read by a processor and executed, a method of transmitting information through a dial pad during a call includes: executing an application program storing all or part of the information and displaying an application interface including the all or part of the information; executing the dial pad in a state where the application interface is displayed, and simultaneously displaying the dial pad and the application interface; and transmitting the information to another party through the dial pad, based on content of the application interface.

DETAILED DESCRIPTION

Figure 1:
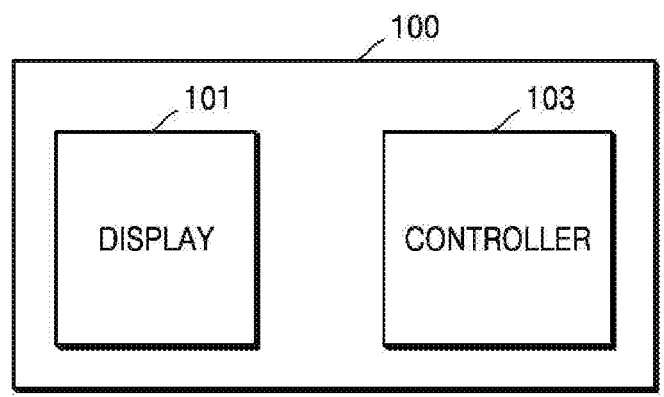
FIG. 1 is a block diagram of an apparatus for transmitting information during a call, according to an embodiment of the present disclosure.

As a technical means of addressing the above technical problem, according to an embodiment, an information transmission method, which is a method of transmitting information through a dial pad during a call, includes: executing an application program storing all or part of the information and displaying an application interface including the all or part of the information; executing the dial pad in a state where the application interface is displayed, and simultaneously displaying the dial pad and the application interface; and transmitting the information to another party through the dial pad, based on content of the application interface.

Hereinafter, various embodiments will be described in the present specification with reference to the accompanying drawings. However, this is not intended to limit the art described in the present specification to particular modes of practice, and various modifications, equivalents and/or alternatives of one or more embodiments in the present specification may also be included in the content of the present specification. Like reference numerals in the drawings denote like elements.

The terms used in the present specification are selected from among general terms that are currently widely used in consideration of their functions in the present specification. However, the terms may be different according to an intention of one of ordinary skill in the art, a precedent, or the advent of new technology. In addition, in particular cases, the terms are discretionally selected by the applicant, and the meaning of those terms will be described in detail in the corresponding part of the detailed description. Therefore, the terms used in the present embodiments should be defined based on not simple designations of the terms but the meaning of the terms and the context of the present specification.

The term "unit" used in the present specification means a software component or a hardware component such as a field-programmable gate array (FPGA) or an application-specific integrated circuit (ASIC), and performs a specific function. However, the term "unit" is not limited to software or hardware. The "unit" may be configured so as to be in an addressable storage medium, or may be configured so as to operate one or more processors. Thus, for example, the "unit" includes components, such as software components, object-oriented software components, class components, and task components, processes, functions, attributes, procedures, subroutines, segments of program code, drivers, firmware, microcode, a circuit, data, a database, data structures, tables, arrays, and variables. The function provided in components and "units" may be combined into a smaller number of components and "units", or may be further divided into additional components and "units".

The terms "have", "may have", "include" or "may include" used herein specify the presence of corresponding features (e.g., elements such as numeric values, functions, operations, or components), but do not preclude the presence of an additional feature.

In the present specification, expressions such as "A or B", "at least one of A and/or B", or "one or more from among A and/or B" may include all possible combinations of items listed together. For example, "A or B", "at least one of A and/or B", or "one or more from among A and/or B" may indicate (1) a case of including at least one A, (2) a case of including at least one B, or (3) a case of including all of at least one A and at least one B.

The terms "first," "second," and the like, used herein may modify various elements without regard to order and/or importance, and these elements should not be limited by these terms. These terms are only used to distinguish one element from another. For example, a first user device and a second user device may indicate different user devices without regard to order or importance. For example, a first element may be termed a second element, and similarly, a second element may be termed a first element, without departing from the scope of claims in the present specification.

It will be understood that when an element (e.g., a first element) is referred to as being "(operatively or communicatively) coupled with/to" or "connected to" another element (e.g., a second element), the element may be directly connected to the other element, or may be connected to the other element through another element (e.g., a third element). On the other hand, it will be understood that when an element (e.g., a first element) is referred to as being "directly coupled" or "directly connected" to another element (e.g., a second element), there may be no other element (e.g., a third element) between the element and the other element.

The expression "configured (or set) to ~" used in the present specification is interchangeable with, for example, "suitable for ~", "having the capacity to ~", "designed to ~", "adapted to ~", "made to~", or "capable of ~", depending on circumstances. The term "configured (or set) to~" may not necessarily mean "specifically designed to ~" in a hardware manner. Instead, under some circumstances, the expression "an apparatus configured to ~" may indicate the apparatus "capable of ~" together with another apparatus or other components. For example, the wording "a processor configured (or set) to perform A, B, and C" may indicate a dedicated processor (e.g., an embedded processor) for performing corresponding operations, or a generic-purpose processor (e.g., a central processing unit (CPU) or an application processor) capable of performing corresponding operations by executing one or more software programs stored in a memory device.

The term "terminal" used in the present specification indicates an apparatus that is connected to a central computer via a communications network and inputs data or outputs a processing result, and for example, the terminal may be an electronic terminal having a touchscreen, such as a smartphone, a tablet computer, a personal computer, a game console, or a multimedia player.

The terminal according to various embodiments of the present specification may include at least one of, for example, a smartphone, a tablet personal computer (PC), a mobile phone, a video phone, an e-book reader, a laptop PC, a netbook computer, a personal digital assistant (PDA), a portable multimedia player (PMP), an MP3 player, a mobile medical device, a camera, and a wearable device. According to various embodiments, the wearable device may include at least one of an accessory type device (e.g., a watch, a ring, a bracelet, an ankle bracelet, a necklace, glasses, a contact lens, or a head mounted device (HMD)), a fabric or clothing integrated type device (e.g., electronic clothes), a body attached type device (e.g., a skin pad or a tattoo), and a bio-implant type device (e.g., an implantable circuit).

The terminal may be a mobile terminal, or a terminal, such as a desktop, that is not portable.

In the present specification, the mobile terminal indicates a relatively small computer device that a user may carry, and may include, for example, a cellular phone, a panel computer, a PDA, or a notebook computer.

The terminology used in the present specification is used only to describe certain embodiments and may not be intended to limit the scope of other embodiments. An expression in the singular may include an expression in the plural unless the context clearly indicates otherwise. All terms used herein including technical or scientific terms have the same meaning as those generally understood by those of ordinary skill in the art. The meaning of terms defined in a general dictionary from among the terms used in the present specification may be the same or similar to the meaning in context of related technology, and are not to be understood as having an ideal or excessively formal meaning unless they are clearly defined in the present specification. In some cases, even if the terms are defined in the present specification, the terms are not to be understood as excluding embodiments of the present specification.

Hereinafter, an information transmission apparatus and an operation method thereof according to various embodiments will be described with reference to the accompanying drawings. In the present specification, the term "user" may indicate a person who uses an apparatus or an apparatus (e.g., an artificial intelligence electronic apparatus) that uses the apparatus.

FIG. 1 is a block diagram of an apparatus for transmitting information during a call, according to an embodiment of the present disclosure. As shown in FIG. 1, an information transmission apparatus 100 may include a display 101 and a controller 103.

Such units may be executed by, for example, a general hardware processor such as a sensor for performing a certain function, a digital signal processor, or FPGAs, or a dedicated hardware processor such as dedicated chips, or may be executed in the form of software, such as each module of an application installed in a terminal to perform information transmission, by a computer program.

The controller 103 may execute an application program storing all or part of information that the information transmission apparatus 100 intends to transmit during a call.

During a call, a user may need to transmit information to the other party. A case where information needs to be transmitted to the other party may include, for example, a case where a certain account number has to be transmitted to the other party during a call, a case where another person's phone number has to be transmitted, or a case where a certain password has to be entered.

For example, when an account number has to be transmitted, the account number that the user has to transmit to the other party may be stored in a certain application program. For example, the account number may be stored in Notepad. In this case, the controller 103 may execute an application program including all or part of information intended to be transmitted, that is, Notepad.

In another embodiment, the application program may be a text message transmission program, various application programs related to chatting, Notepad, an address book, or other various types of application programs.

The controller 103 may display a certain application interface including all or part of information intended to be transmitted. In the above embodiment, the controller 103 may execute a Notepad program and thus open and display a file having recorded thereon an account number to be transmitted.

In another embodiment, when the application program storing information to be transmitted is a text message program, the controller 103 may execute a text message transmission program and thus display the content of a certain text message including information to be transmitted to the other party on the terminal.

In a state where the application interface is displayed, the controller 103 may execute a dial pad.

In the present disclosure, the dial pad may mean a program generally used in an electronic phone, in which a user input is received through a pad including keys respectively generating different pulse signals. Types of the dial pad will be described below with reference to FIGS. 9A and 9B.

The dial pad may be executed in various manners, and a description thereof will be given below with reference to FIGS. 4 to 6.

In a state where the application interface is displayed, the controller 103 may execute the dial pad. The controller 103 may display the executed dial pad and the application interface simultaneously.

The controller 103 may display the dial pad and the application interface simultaneously by using various effects. For example, the controller 103 may display the executed dial pad and the application interface so as to overlap or not to overlap each other on a screen.

In addition, the controller 103 may control transmission of information to the other party through the dial pad, based on the content of the application interface. The user may input information to the dial pad while directly referring to the content of the application interface displayed simultaneously.

When a numeric string, a character string, or the like difficult to remember at a time is transmitted, the user may transmit information to the other party through the dial pad while conveniently referring to the content of the application interface on one screen, instead of remembering and inputting the content of the application interface to the dial pad while switching between the application interface where information is stored and the dial pad.

In some embodiments, the information transmitted to the other party may be used as an input value of an application program installed at the other party. For example, the information transmitted to the other party may be used as a certain input value of an automatic response system (ARS).

In some embodiments, the information transmitted to the other party may be received by the other party through a predetermined application program. For example, the information transmitted to the other party may be received in the form of a short message service (SMS) or a chatting message by the other party.

The display 101 may display the application interface, etc., and may display the dial pad simultaneously under the control of the controller 103 while displaying the application interface.

In an embodiment, the display 101 may be a display screen having a touch function. The display screen having a touch function may include a display liquid crystal (for example, liquid crystal display (LCD)) having millions of pixels and a touch pad installed at the display liquid crystal. The touchscreen is the prior art in the same technical field, and thus, a detailed description thereof will be omitted.

In a state where the dial pad is displayed, manipulation of a section corresponding to the dial pad on the display 101 may be directly transmitted to the controller 103, and thus, corresponding processing may be performed by the controller 103. For example, when a key click on the dial pad is completed, information or a signal corresponding to a clicked key may be generated and transmitted through a communication module, etc.

In the present embodiment, the display 101 and the controller 103 are described as separate configuration units. However, in some embodiments, the display 101 and the controller 103 may be combined and be realized as the same configuration unit.

In addition, in the present embodiment, the display 101 and the controller 103 are described as adjacent configuration units in the information transmission apparatus 100. However, apparatuses serving respective functions of the display 101 and the controller 103 do not necessarily need to be physically adjacent to each other. Accordingly, in some embodiments, the display 101 and the controller 103 may be scattered.

In addition, since the information transmission apparatus 100 is not limited to a physical apparatus, some functions of the information transmission apparatus 100 may be realized not as hardware but as software.

Figure 2:
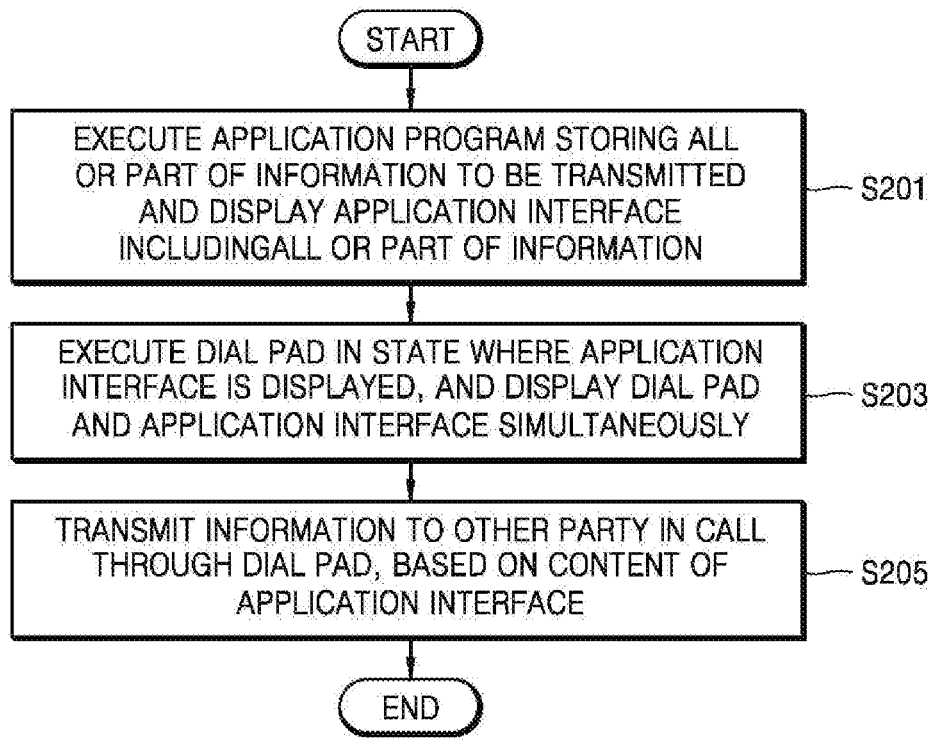
FIG. 2 is a flowchart of a method of transmitting information during a call, according to an embodiment of the present disclosure.

FIG. 2 is a flowchart of a method of transmitting information during a call, according to an embodiment of the present disclosure.

In operation S201, the information transmission apparatus 100 may execute an application program storing all or part of information to be transmitted and display an application interface including all or part of the information.

According to an embodiment, the information transmission apparatus 100 may receive information for selecting a certain application program from among available application programs from a user and display an application interface of the selected application program on the display 101.

The information transmission apparatus 100 may receive selection of the application program storing all or part of information to be transmitted to the other party automatically by a predetermined setting or manually by the user's selection.

In addition, in operation S203, the information transmission apparatus 100 may execute a dial pad in a state where the application interface is displayed, and display the dial pad and the application interface simultaneously. Execution of the dial pad in the state where the application interface is displayed may be performed in various ways. A detailed description thereof is given below.

In operation S205, the information transmission apparatus 100 may transmit information to the other party in the call through the dial pad, based on the content of the application interface.

While directly looking at the application interface, the user may input all or part of the content displayed on the application interface to the dial pad. When a key click on the dial pad is completed, information or a signal corresponding to a clicked key may be generated and transmitted through a communication module, etc.

Figure 3:
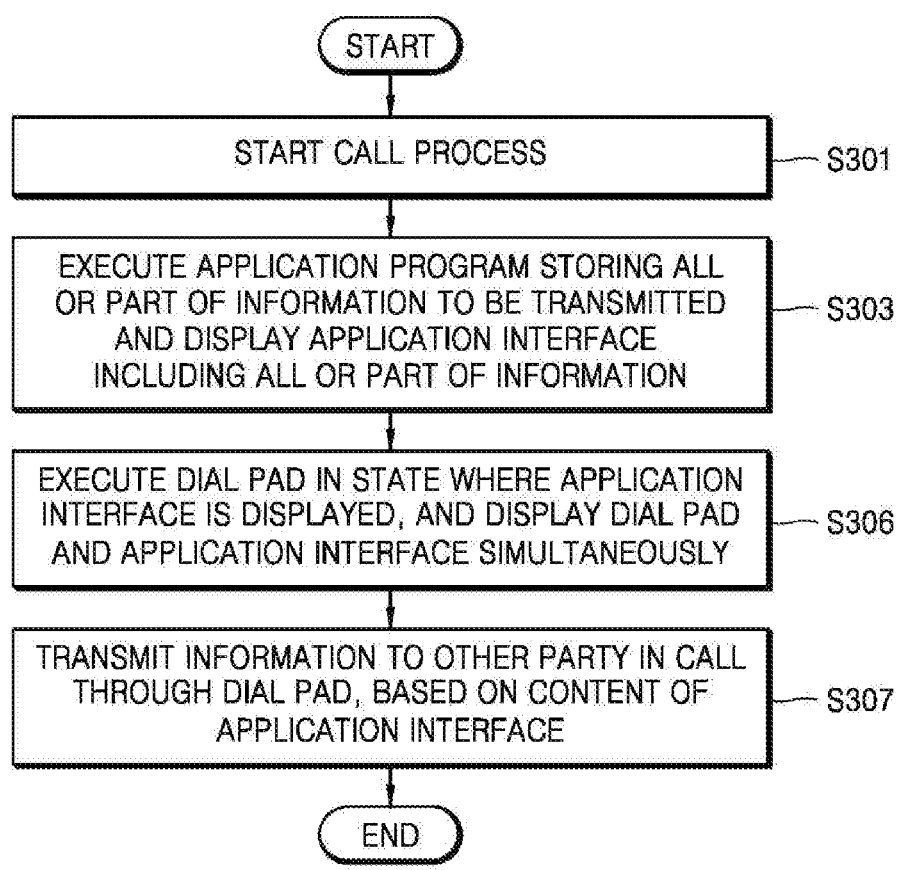
FIG. 3 is a flowchart of a method of transmitting information during a call, according to another embodiment of the present disclosure.

FIG. 3 is a flowchart of a method of transmitting information during a call, according to another embodiment of the present disclosure.

In an embodiment, the information transmission apparatus 100 may start a call process before performing the operation shown in operation S201 of FIG. 2.

In operation S301, the information transmission apparatus 100 may start the call process. The call process may mean a series of processes of performing a voice call or a video call with the other party.

The call process may be started by selecting or inputting a phone number of the other party and then releasing the phone number of the other party through a call application program or by responding to an external call request. A user may become involved in the call by starting the call process.

In operation S303, the information transmission apparatus 100 may execute an application program storing all or part of information to be transmitted and display an application interface including all or part of the information.

After starting the call process, the information transmission apparatus 100 may display a call interface. The information transmission apparatus 100 may control the display 101 in various ways and terminate display of the call interface. For example, display of the call interface may be terminated by clicking a key such as a home key.

When display of the call interface is terminated, the information transmission apparatus 100 may display an initial screen. When the application program is executed on the initial screen, the information transmission apparatus 100 may display the application interface.

The information transmission apparatus 100 may also display the application interface by directly executing the application program in a state where the call interface is not terminated.

In another embodiment, the information transmission apparatus 100 may directly execute the application program at the call interface by means of another shortcut key manipulation method. For example, the application program may be invoked by directly invoking a predetermined shortcut key menu of the application program.

The information transmission apparatus 100 may execute a selected application program and display an application interface including all or part of information to be transmitted.

In addition, the information transmission apparatus 100 may execute a dial pad in a state where the application interface is displayed, and display the dial pad and the application interface simultaneously (operation S305).

The information transmission apparatus 100 may also transmit information to the other party in the call through the dial pad, based on the content of the application interface (operation S307).

Figure 4A:
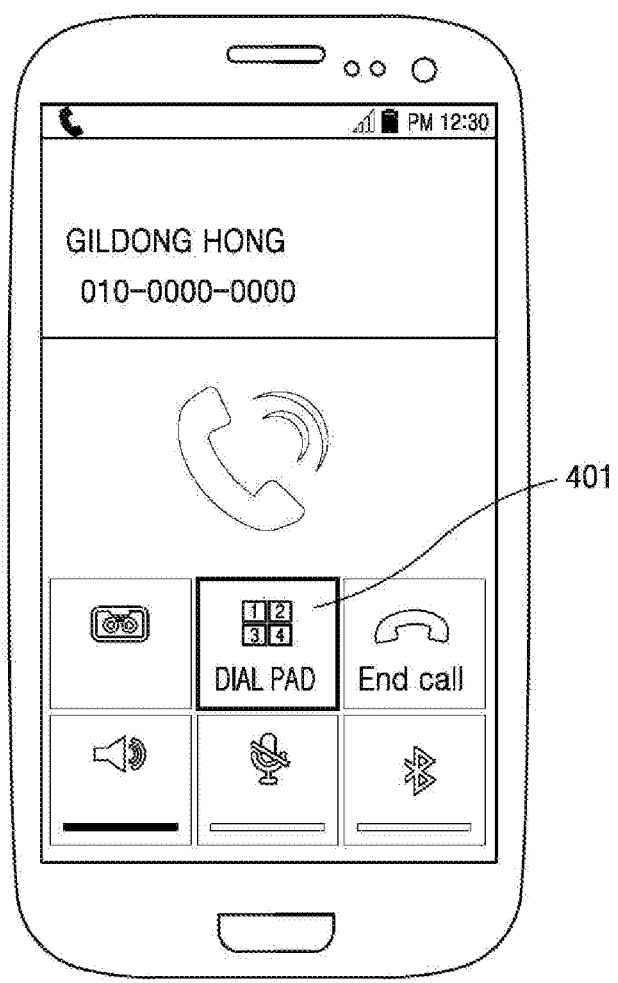
FIG. 4A shows a method of executing a dial pad during a call, according to an embodiment of the present disclosure.

FIG. 4A shows a method of executing a dial pad during a call, according to an embodiment of the present disclosure.

When information such as numbers and/or characters needs to be transmitted to the other party while a call is generated by a sender in a terminal, transmission of numbers and/or characters may be completed by selecting a key corresponding to information transmission on the dial pad.

There may be various methods of executing the dial pad to transmit information.

In an embodiment, the information transmission apparatus 100 may execute the dial pad by receiving an input regarding a dial pad button 401 present on a call interface. In the present disclosure, the call interface may mean an execution screen of a call program for proceeding with a call process.

Figure 4B:
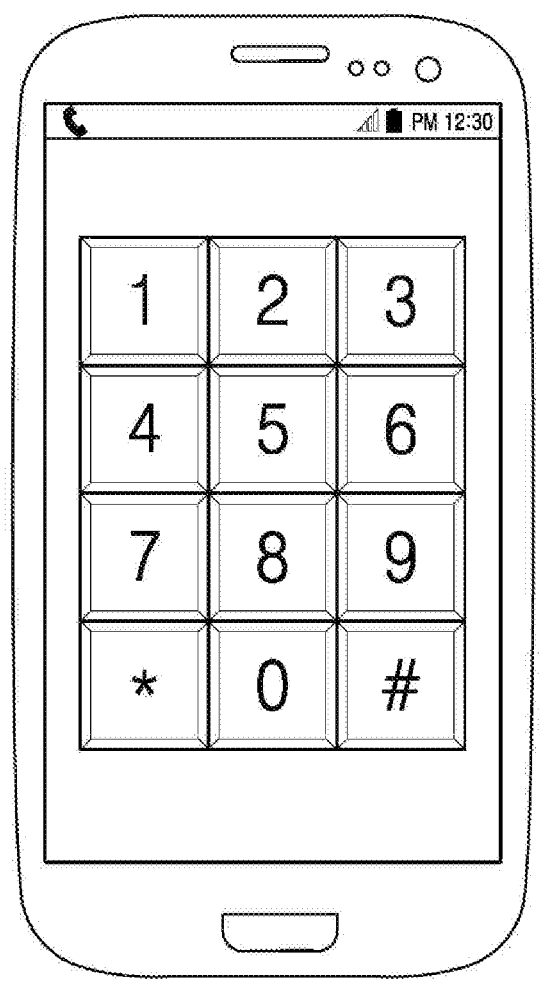
FIG. 4B shows an example of a dial pad executed during a call, according to an embodiment of the present disclosure.

FIG. 4B shows an example of a dial pad executed during a call, according to an embodiment of the present disclosure.

In an embodiment, the dial pad executed by receiving an input regarding the dial pad button 401 present on a call interface in FIG. 4A may be in the form of an ordinary keyboard completely including numbers and symbols such as "*" and "#" as shown in FIG. 4B.

The ordinary keyboard may be a dual tone multi frequency (DTMF) keyboard adopting a DTMF method.

According to the DTMF method, which is one of signaling methods in which, whenever a button is pressed, a unique frequency allocated to each button is transmitted to a phone company, when a user presses a dial button, tones of two different frequencies corresponding to each button are transmitted to the phone company, and thus, which button has been pressed by the user may be identified. In this regard, the tones of two different frequencies are used to prevent a malfunction due to noise or artificial manipulation.

In some embodiments, the dial pad may be any other type of a keyboard capable of executing the same function as or a similar function to that of the ordinary keyboard.

Figure 5:
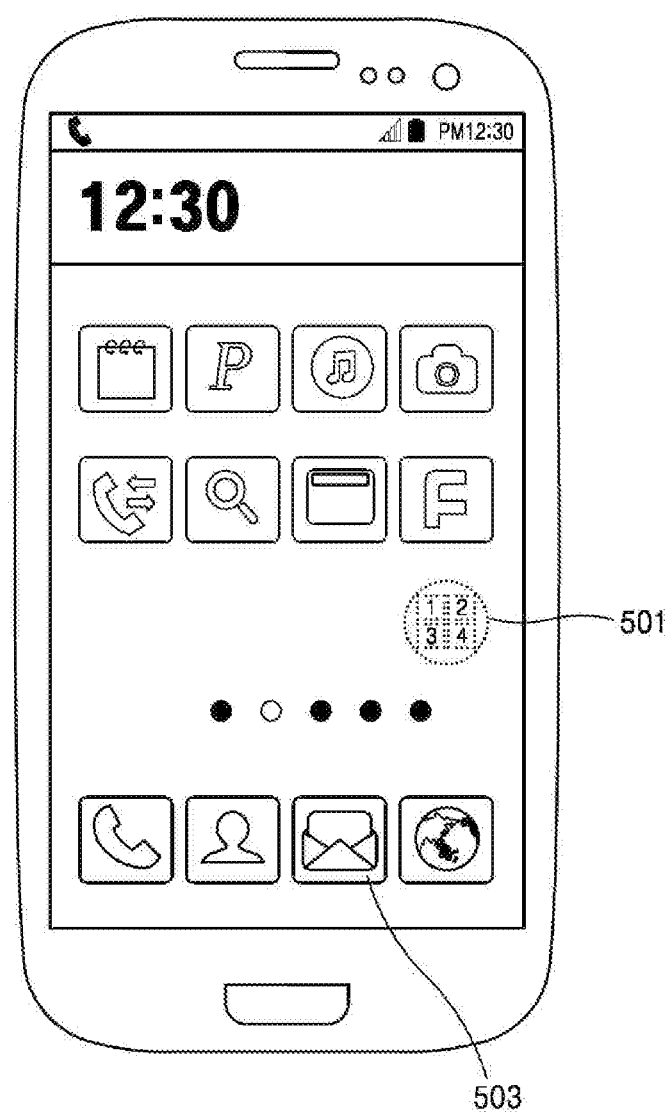
FIG. 5 shows a method of executing a dial pad during a call, according to another embodiment of the present disclosure.

FIG. 5 shows a method of executing a dial pad during a call, according to another embodiment of the present disclosure.

The information transmission apparatus 100 may receive an input regarding a home key, etc. at a call interface and display an initial screen during the call. In an embodiment, the information transmission apparatus 100 may display a dial pad button 501 on the initial screen as shown in FIG. 5. The dial pad button 501 may be in the form of a floating button.

In addition, in some embodiments, the dial pad button 501 may be displayed while overlapping other application icons of the initial screen.

In some embodiments, the dial pad button 501 may be displayed in a transparent form. A transparency of the dial pad button 501 may be adjusted.

The information transmission apparatus 100 may execute the dial pad by receiving an input regarding the dial pad button 501 of the initial screen during the call.

In some embodiments, a dial pad icon may be used instead of the dial pad button 501.

Figure 6:
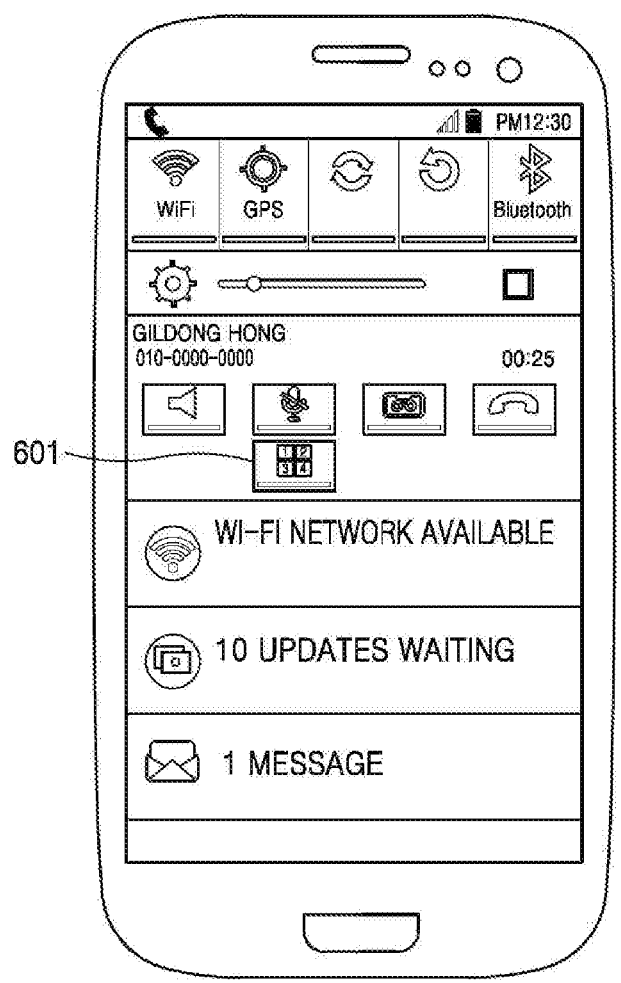
FIG. 6 shows a method of executing a dial pad during a call, according to another embodiment of the present disclosure.

FIG. 6 shows a method of executing a dial pad during a call, according to another embodiment of the present disclosure.

The information transmission apparatus 100 may receive an input regarding a home key, etc. at a call interface and display an initial screen during the call. Next, according to instructions received from a user on the initial screen, the information transmission apparatus 100 may perform various operations even during the call.

For example, the information transmission apparatus 100 may execute the dial pad by receiving an input regarding a dial pad button 601 on a notification bar during the call.

In some embodiments, a dial pad icon may be used instead of the dial pad button 601.

Figure 7:
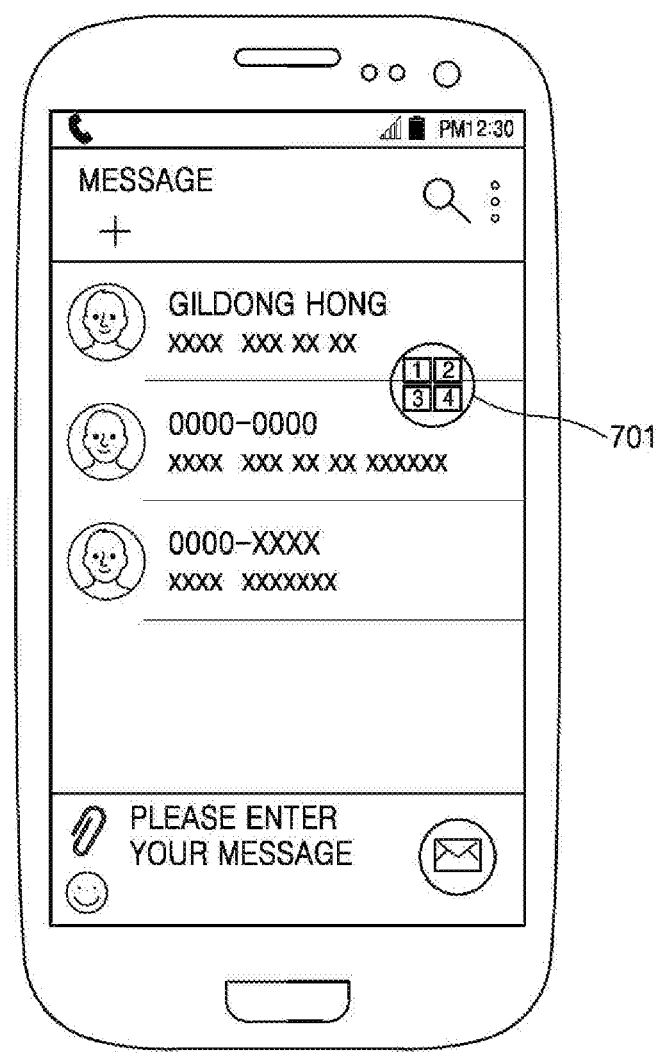
FIG. 7 shows a method of executing a dial pad in a state where an application program is executed during a call, according to an embodiment of the present disclosure.

FIG. 7 shows a method of executing a dial pad in a state where an application program is executed during a call, according to an embodiment of the present disclosure.

The information transmission apparatus 100 may receive an input regarding a home key, etc. at a call interface and display an initial screen during the call. The information transmission apparatus 100 may execute the application program selected by a user on the initial screen.

In an embodiment, the information transmission apparatus 100 may execute a text message program during the call. As shown in FIG. 7, the information transmission apparatus 100 may display a dial pad button 701 in a state where the text message program is implemented. The information transmission apparatus 100 may execute the dial pad by receiving an input regarding the displayed dial pad button 701.

Figure 8:
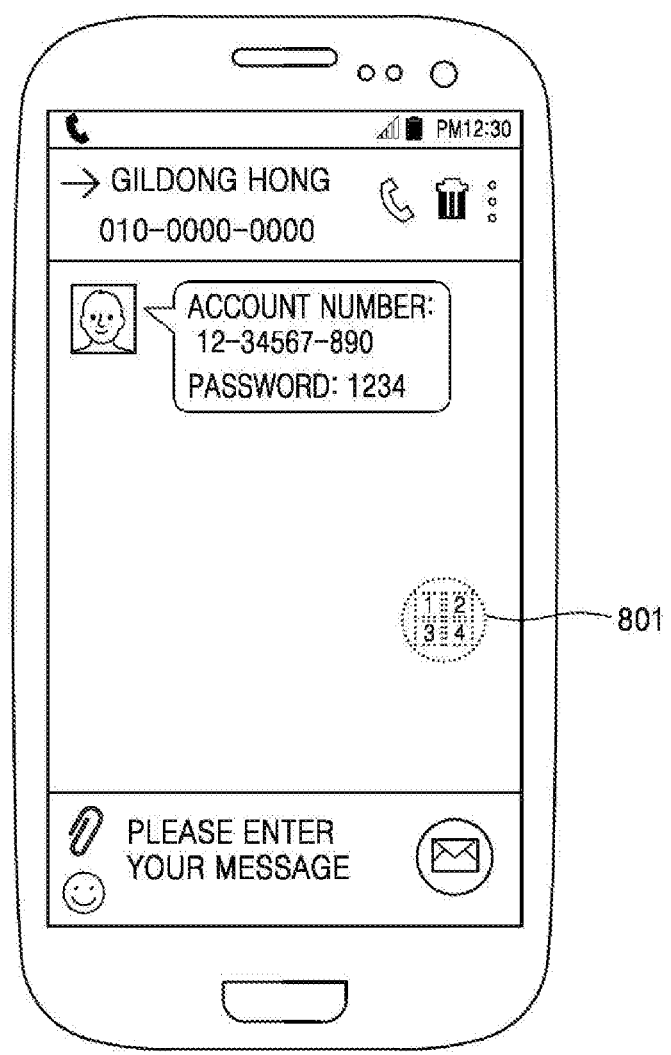
FIG. 8 shows a method of executing a dial pad in a state where an application interface is displayed during a call, according to an embodiment of the present disclosure.

FIG. 8 shows a method of executing a dial pad in a state where an application interface is displayed during a call, according to an embodiment of the present disclosure.

In an embodiment, the information transmission apparatus 100 may receive an input regarding a home key, etc. at a call interface and display an initial screen during the call. The information transmission apparatus 100 may execute an application program selected by a user on the initial screen.

In an embodiment, the information transmission apparatus 100 may execute a text message program during the call. The information transmission apparatus 100 may display a certain text message interface including information to be transmitted to the other party by implementing the text message program. During such a process, the information transmission apparatus 100 may keep displaying a dial pad button 801 as shown in FIG. 8.

As in the embodiment of FIG. 8, the information transmission apparatus 100 may display the dial pad button 801 in a state where a text message interface including an account number to be transmitted to the other party is displayed, and receive an input regarding the dial pad button 801 from the user. The information transmission apparatus 100 having received the input regarding the dial pad button 801 may execute the dial pad.

Figure 9:
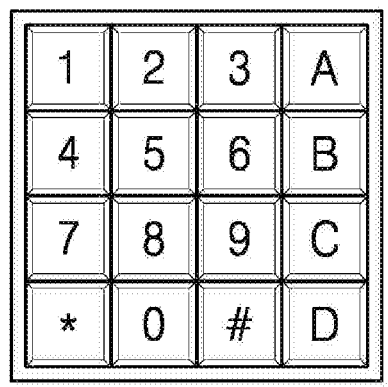
FIG. 9 shows an example of an executed dial pad according to an embodiment of the present disclosure.

FIG. 9 shows an example of an executed dial pad according to an embodiment of the present disclosure.

The dial pad may adopt various forms in addition to the form of an ordinary dial pad shown in FIG. 4B.

In an embodiment, as shown in FIG. 9, the dial pad may further include four keys indicating A, B, C, and D in the ordinary dial pad shown in FIG. 4B.

However, a form of the dial pad is not limited to a form recorded in the present disclosure. The form of the dial pad may be the form of an ordinary keyboard and the form of any keyboard capable of executing the same function as or a similar function to that of the ordinary keyboard.

Figure 10:
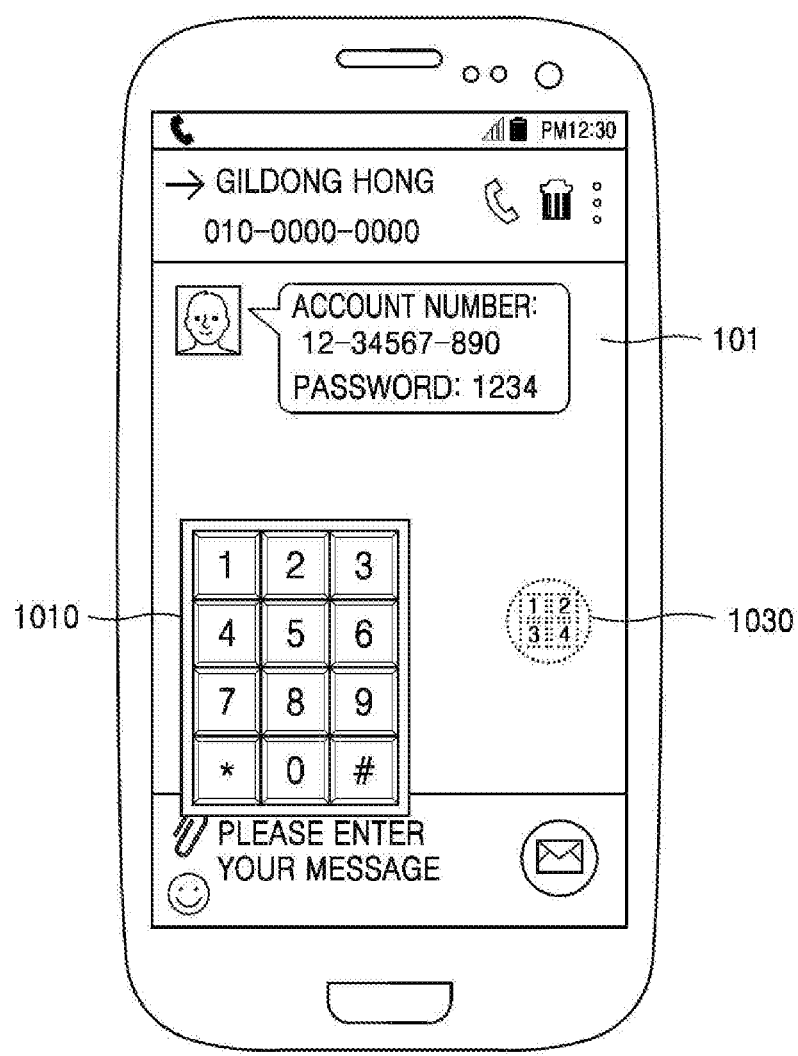
FIG. 10 shows an example in which an application interface and a dial pad are simultaneously displayed during a call, according to an embodiment of the present disclosure.
Figure 11:
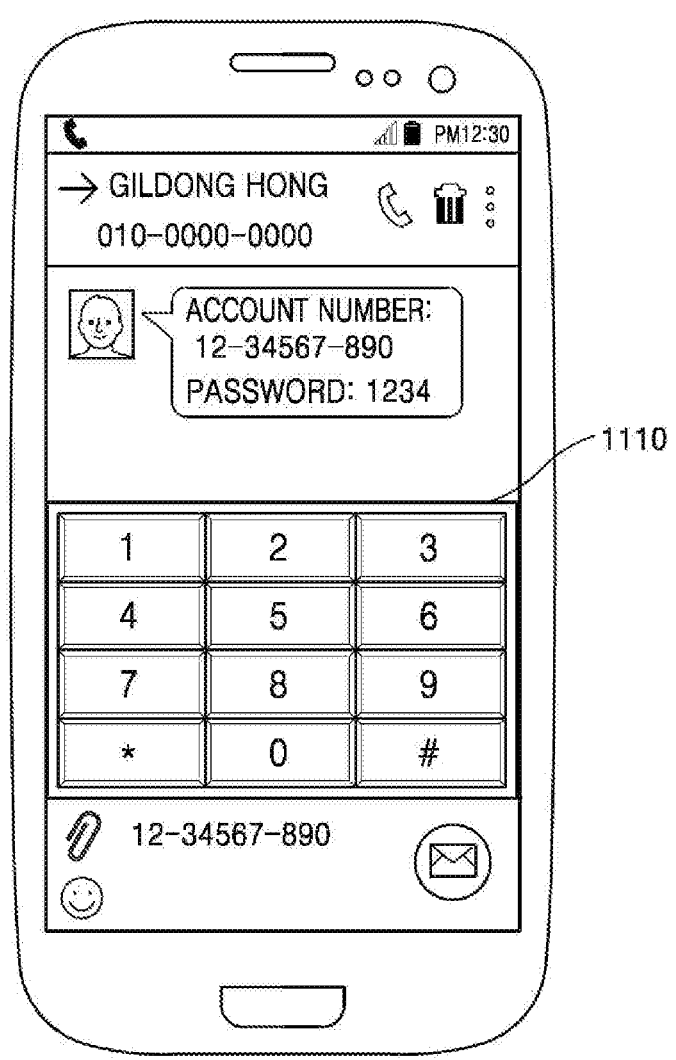
FIG. 11 shows an example in which an application interface and a dial pad are simultaneously displayed during a call, according to another embodiment of the present disclosure.
Figure 12:
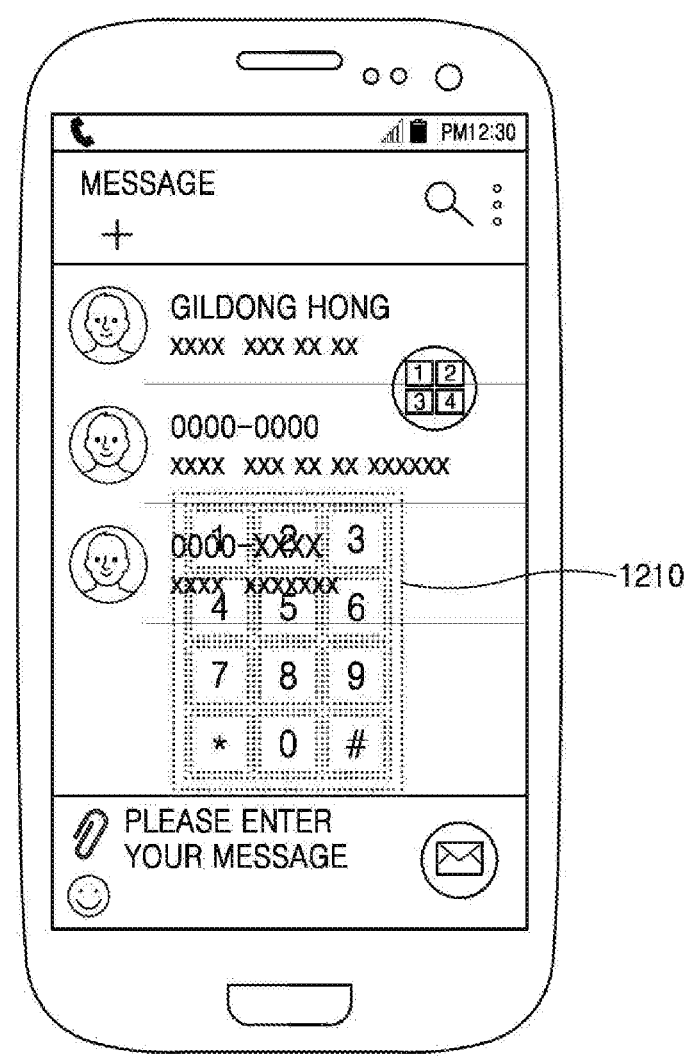
FIG. 12 shows an example in which an application interface and a dial pad are simultaneously displayed during a call, according to another embodiment of the present disclosure.

FIGS. 10 to 12 each show an example in which an application interface and a dial pad are simultaneously displayed during a call, according to an embodiment of the present disclosure.

When information such as corresponding numbers and/or characters at a call interface needs to be transmitted to the other party while a call is generated by a sender in a terminal, transmission of numbers and/or characters from among information to be transmitted may be performed by selecting a key corresponding to information transmission on the dial pad.

When the information to be transmitted is stored in another application program such as an application program, the sender may check information transmission stored in the application program and may directly transmit the checked information transmission through the sender's manipulation of the dial pad.

The dial pad and the application interface may be displayed simultaneously in various ways, and a user's convenience may be increased or reduced according to a display method.

As in the embodiment of FIG. 10, a text message application interface and display of a dial pad 1010 may be displayed so as to overlap each other. The text message application interface and the dial pad 1010 may partially or entirely overlap each other, and thus, a larger display area may be allocated to the application interface or the dial pad 1010. In this case, the information transmission apparatus 100 may also display a dial pad button 1030 while simultaneously displaying the text message application interface and the display of the dial pad 1010 so as to overlap each other. The dial pad button 1030 may also be displayed so as to overlap the text message application interface and the display of the dial pad 1010.

In an embodiment, the information transmission apparatus 100 may receive again a user input regarding the dial pad button 1030 in a state where the dial pad 1010 is displayed, and terminate the dial pad 1010. When the dial pad 1010 is terminated, the information transmission apparatus 100 may display the text message application interface and the dial pad button 1030.

In the embodiment of FIG. 11, a text message application interface and display of a dial pad 1110 may each occupy a portion of a display screen and may be displayed in their own respective regions so as not to overlap each other. Regarding such a display format, the text message application interface and the display of the dial pad 1110 may each occupy 50% of the display screen or may occupy together 100% of the display screen at various proportions.

In some embodiments, the text message application interface and the display of the dial pad 1110 may be displayed smaller than 100% of the display screen.

In the embodiment of FIG. 12, which is an extendable embodiment of a method of displaying a dial pad or a dial pad button using an overlap method, the information transmission apparatus 100 may display a displayed dial pad, dial pad button, or application interface using a transparent or semi-transparent effect. By displaying a dial pad, a dial pad button, or an application interface using a transparent or semi-transparent effect, the information transmission apparatus 100 may reduce influence of the dial pad and the dial pad button on displaying an application program caused by overlappingly displaying the dial pad and the dial pad button.

In the embodiments of FIGS. 10 to 12, a dial pad button may be replaced with a dial pad icon, and the information transmission apparatus 100 may fold or unfold display of a dial pad interface by clicking the dial pad icon on a touchscreen.

An icon representing a dial pad may be displayed in a manipulatable area of the display 101 using a visual effect of hovering or an effect of overlapping an application program, and may be dragged into the remaining manipulatable area.

In addition, there may be various methods of displaying an application interface, a dial pad, and a dial pad button, and such methods are not limited to the content recorded in the present disclosure.

Figure 13:
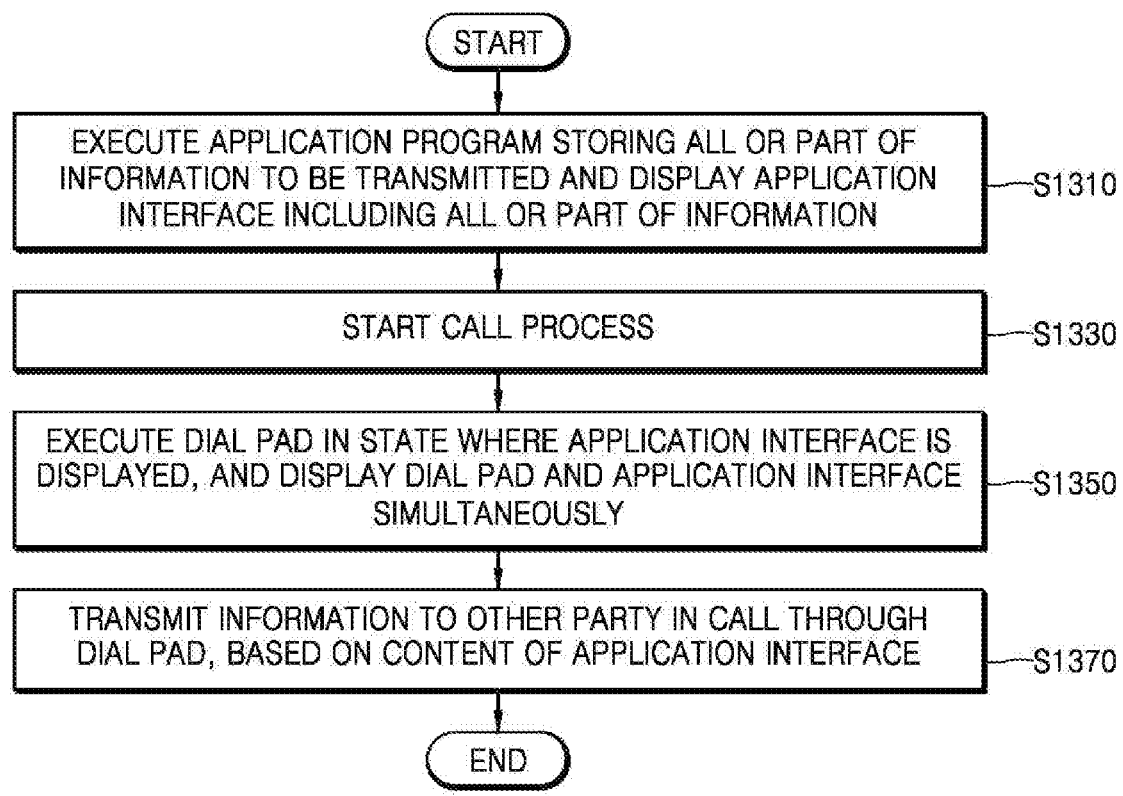
FIG. 13 shows a method of executing a dial pad during a call, according to an embodiment of the present disclosure.

FIG. 13 is a flowchart of a method of executing a dial pad during a call, according to an embodiment of the present disclosure.

A user may think of having to make a phone call while executing an application program. In this case, the information transmission apparatus 100 may start a call process (operation S1330) in a state where an application program storing all or part of information to be transmitted is executed and thus an application interface including all or part of the information is displayed (operation S1310).

In the present disclosure, the call process may mean a series of processes of performing a voice call or a video call with the other party.

After starting the call process, the information transmission apparatus 100 may return to the application interface of the application program already executed.

In operation S1350, the information transmission apparatus 100 may execute a dial pad in a state where the application interface is displayed, and display the dial pad and the application interface simultaneously.

In addition, in operation S1370, the information transmission apparatus 100 may transmit information input through the dial pad based on the content of the application interface to the other party in the call.

Figure 14:
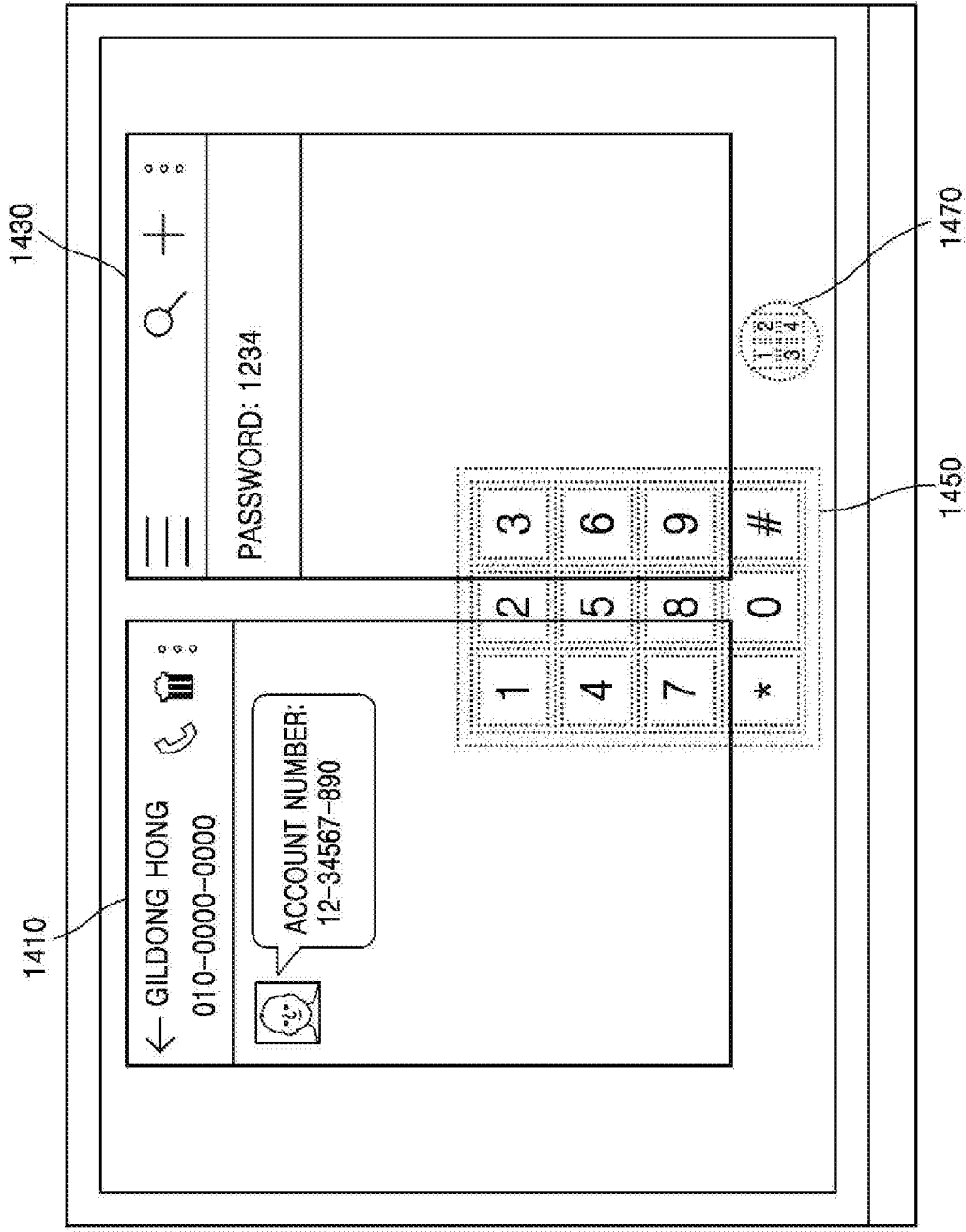
FIG. 14 shows an example in which a plurality of application interfaces and a dial pad are simultaneously displayed, according to an embodiment of the present disclosure.

FIG. 14 shows an example in which a plurality of application interfaces and a dial pad are simultaneously displayed, according to an embodiment of the present disclosure.

According to an embodiment, when information that a user intends to transmit to the other party is stored over a plurality of application programs, a plurality of application interfaces for the plurality of application programs may be simultaneously displayed so that the user may read pieces of necessary information simultaneously.

The information transmission apparatus 100 may execute a dial pad in a state where the plurality of application interfaces are displayed by executing the plurality of applications.

In an embodiment, when the information transmission apparatus 100 is a notebook computer, and the information that the user intends to transmit to the other party is an account number and a password, the account number may be stored in a text message program 1410, and the password of an account may be stored in Notepad 1430. The information transmission apparatus 100 may execute a dial pad 1450 in a state where a text message interface including the account number and a Notepad interface including the password are simultaneously displayed.

The user may input the information to be transmitted to the other party through the dial pad 1450 by referring to the text message interface 1410 storing the account number and the Notepad interface 1430 storing the password at a look.

In some embodiments, the information that the user intends to transmit may be stored over three or more application programs. In this case, the information transmission apparatus 100 may display necessary application interfaces simultaneously by using various display methods.

Meanwhile, the present invention may be stored and embodied as computer-readable codes on a computer-readable storage medium. The computer-readable storage medium is any data storage device that stores data which may thereafter be read by a computer system.

The computer-readable codes are configured to perform operations of implementing an information transmission method according to the present invention when the computer-readable codes are read from the computer-readable storage medium by a processor and are executed. The computer-readable codes may be executed with various programming languages. In addition, functional programs, codes, and code segments for implementing embodiments of the present invention may be easily programmed by those of ordinary skill in the art.

Examples of the computer-readable storage medium include read-only memory (ROM), random-access memory (RAM), compact disc read-only memory (CD-ROM), magnetic tapes, floppy disks, optical data storage devices, and carrier waves (for example, transmission through the Internet). The computer-readable storage medium may be distributed among computer systems that are interconnected through a network, and thus, the computer-readable codes may be stored and executed in a distributed fashion.

The above descriptions of the present disclosure are given for illustrative purposes, and it will be understood by those of ordinary skill in the art that various changes in form and details may be made therein without departing from the spirit and scope of the present disclosure as defined by the following claims. Hence, it should be understood that the embodiments described above should be considered in a descriptive sense only and not for purposes of limitation. For example, each component described in a single type may be executed in a distributed manner, and components described distributed may also be executed in an integrated form.

The scope of the present invention is indicated by the appended claims rather than by the detailed description of the invention, and it should be understood that the claims and all modifications or modified forms drawn from the concept of the claims are included in the scope of the present invention.

The invention claimed is:

1. An information transmission method of transmitting information using a dial pad during a call, the information transmission method comprising:
   executing an application storing at least a portion of information;
   displaying, during the call, an application interface including the portion of information;
   displaying, during the call, a dial pad icon configured to provide the dial pad;
   displaying, during the call, the dial pad in a state in which the application interface is displayed; and
   transmitting the information to another device using the dial pad, during the call, based on content of the portion of information displayed on the application interface,
   wherein the dial pad and the portion of information of the application interface at least partially overlapping each other.

2. The information transmission method of claim 1, wherein the dial pad icon is displayed as a floating button indicating the dial pad.

3. The information transmission method of claim 2, wherein at least one of the floating button indicating the dial pad and the dial pad is transparently displayed or translucently displayed.

4. The information transmission method of claim 1, wherein the dial pad is executed by receiving an input via a dial pad button added to a notification bar.

5. The information transmission method of claim 1, further comprising executing a call process.

6. The information transmission method of claim 1, wherein, when the application storing the portion of information comprises a plurality of application programs, a plurality of application interfaces comprising the portion of information are simultaneously displayed by executing the plurality of application programs.

7. An information transmission apparatus for transmitting information using a dial pad during a call, the information transmission apparatus comprising:
   a display; and
   a controller configured to:
      execute an application storing at least a portion of information;
      display, during the call, an application interface including the portion of information;
      display, during the call, a dial pad icon configured to provide the dial pad;
      display, during the call, the dial pad in a state in which the application interface is displayed; and
      transmit the information to another device using the dial pad, during the call, based on content of the portion of information displayed on the application interface,
      wherein the dial pad and the portion of information of the application interface at least partially overlapping each other.

8. The information transmission apparatus of claim 7, wherein the dial pad icon is displayed as a floating button indicating the dial pad.

9. The information transmission apparatus of claim 8, wherein at least one of the floating button indicating the dial pad and the dial pad is transparently displayed or translucently displayed.

10. The information transmission apparatus of claim 7, wherein the dial pad is executed by receiving an input via a dial pad button added to a notification bar.

11. The information transmission apparatus of claim 7, wherein the controller is further configured to execute a call process.

12. The information transmission apparatus of claim 7, wherein, when the application storing the portion of information comprises a plurality of application programs, a plurality of application interfaces comprising the portion of information are simultaneously displayed by executing the plurality of application programs.

13. A non-transitory computer-readable recording medium having recorded thereon a program comprising a plurality of instructions that, when executed by a processor of a computer device, is configured to cause the processor to:
   execute an application storing at least a portion of information;
   display, during a call, an application interface including the portion of information;
   display, during the call, a dial pad icon configured to provide a dial pad;
   display, during the call, the dial pad in a state in which the application interface is displayed; and transmit the information to another device using the dial pad, during the call, based on content of the portion of information displayed on the application interface,
wherein the dial pad and the portion of information of the application interface at least partially overlapping each other.

14. The non-transitory computer-readable recording medium of claim 13, wherein the dial pad icon is displayed as a floating button indicating the dial pad.

15. The non-transitory computer-readable recording medium of claim 14, wherein at least one of the floating button indicating the dial pad and the dial pad is transparently displayed or translucently displayed.

16. The non-transitory computer-readable recording medium of claim 13, wherein the dial pad is executed by receiving an input via a dial pad button added to a notification bar.

17. The non-transitory computer-readable recording medium of claim 13, wherein the plurality of instructions when executed by the processor further causes the processor to execute a call process.

\* \* \* \* \*